US012811931B2

(12) United States Patent
Jain et al.

(10) Patent No.: US 12,811,931 B2
(45) Date of Patent: Nov. 24, 2026

(54) TRUST RELATIONSHIPS TO SHARE CLIENT ASSETS AMONG CLIENT ACCOUNTS IN A SOFTWARE AS A SERVICE PLATFORM

(71) Applicant: Twilio Inc., San Francisco, CA (US)

(72) Inventors: Prateek Jain, San Francisco, CA (US); Jonathan Daniel Jenkins, Lafayette, CO (US); Saurabh Daftary, Walnut Creek, CA (US); Abhishek Swaroop, Dublin, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 18/957,568

(22) Filed: Nov. 22, 2024

(65) Prior Publication Data

US 2025/0088508 A1 Mar. 13, 2025

Related U.S. Application Data

(63) Continuation of application No. 17/501,883, filed on Oct. 14, 2021, now Pat. No. 12,184,645.

(51) Int. Cl.
*H04L 29/06* (2006.01)
*H04L 9/40* (2022.01)
*H04L 67/133* (2022.01)

(52) U.S. Cl.
CPC ...... *H04L 63/0869* (2013.01); *H04L 63/0807* (2013.01); *H04L 63/108* (2013.01); *H04L 67/133* (2022.05)

(58) Field of Classification Search
CPC . H04L 63/0869; H04L 63/0807; H04L 63/10; H04L 63/0263; H04L 63/108; H04L 63/20
See application file for complete search history.

(56) References Cited

U.S. PATENT DOCUMENTS

| | | | | |
|---|---|---|---|---|
| 8,931,041 | B1 | 1/2015 | Banerjee | |
| 9,210,276 | B2 * | 12/2015 | Hunt | H04M 15/51 |
| 10,033,702 | B2 | 7/2018 | Ford et al. | |
| 10,212,143 | B2 | 2/2019 | Allain et al. | |

(Continued)

OTHER PUBLICATIONS

International Search Report and Written Opinion for International Application No. PCT/US2022/046718, mailed Feb. 3, 2023, 15 Pages.

*Primary Examiner* — Longbit Chai
(74) *Attorney, Agent, or Firm* — Lowenstein Sandler LLP

(57) ABSTRACT

A method of managing a client asset includes configuring client accounts in a first hierarchy of accounts. The client accounts include a first client account and a second client account ranked in the first hierarchy of accounts. A first request to establish a trusted relationship with the second client account of the SaaS platform to share the client asset associated with the first client account is received. The first request satisfies one or more conditions related to the first hierarchy of accounts and the trusted relationship is determined. A second request to perform a communication operation based on the client asset associated with the first client account is received. The communication operation is performed on behalf of the second client account using the client asset associated with the first client account and based on an indication of the trusted relationship between the first client account and the second client account.

21 Claims, 6 Drawing Sheets

(56) References Cited

U.S. PATENT DOCUMENTS

| | | | | |
|---|---|---|---|---|
| 10,257,495 | B1 | 4/2019 | Poder et al. | |
| 10,685,351 | B1 | 6/2020 | Sorbello | |
| 11,102,214 | B2 * | 8/2021 | Kukreja | G06F 9/468 |
| 2007/0192619 | A1 | 8/2007 | Gifford et al. | |
| 2014/0013396 | A1 | 1/2014 | Field-Eliot et al. | |
| 2014/0282923 | A1 | 9/2014 | Narayan et al. | |
| 2015/0222604 | A1 | 8/2015 | Ylonen | |
| 2018/0068132 | A1 | 3/2018 | Zubair et al. | |
| 2018/0077143 | A1 | 3/2018 | Sridharan et al. | |
| 2018/0227128 | A1 | 8/2018 | Church et al. | |
| 2019/0342400 | A1 | 11/2019 | Van Rotterdam et al. | |
| 2020/0029178 | A1 | 1/2020 | Smith | |
| 2020/0104478 | A1 * | 4/2020 | Chauhan | G06F 16/27 |
| 2020/0120159 | A1 | 4/2020 | Momchilov et al. | |
| 2021/0385224 | A1 | 12/2021 | Singh et al. | |
| 2022/0046023 | A1 | 2/2022 | Friend et al. | |
| 2023/0115112 | A1 | 4/2023 | Lee et al. | |

* cited by examiner

TRUST RELATIONSHIPS TO SHARE CLIENT ASSETS AMONG CLIENT ACCOUNTS IN A SOFTWARE AS A SERVICE PLATFORM

RELATED APPLICATIONS

This application is a continuation application of U.S. patent application Ser. No. 17/501,883, filed Oct. 14, 2021, which is incorporated by reference herein in its entirety.

TECHNICAL FIELD

Aspects and embodiments of the disclosure relate to computer networking, and more specifically, to systems and methods for sharing client assets among client accounts of a software as a service (SaaS) platform.

BACKGROUND

Sensitive data can include classified information that is to be protected and/or that is to be inaccessible to outside parties unless specifically granted permission. Often the sensitive data can be in an electronic form and is regarded as private information.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure provides a method of managing client assets in a service as a software (SaaS) platform. The method comprises receiving, via a first application programming interface (API) call associated with a first client account of the SaaS platform, a first request to establish a trusted relationship with a second client account of the SaaS platform, wherein the trusted relationship enables sharing, with the second client account, of a client asset associated with the first client account; determining whether the first request satisfies one or more conditions related to the trusted relationship; responsive to determining that the first request satisfies the one or more conditions related to the trusted relationship, storing an indication of the trusted relationship between the first client account and the second client account in a data store; receiving, via a second API call associated with the second client account, a second request to perform a communication operation based on the client asset associated with the first client account; and performing the communication operation on behalf of the second client account using the client asset associated with the first client account and based on the indication of the trusted relationship between the first client account and the second client account.

The method wherein the client asset comprises a first authorization token that is provided by the SaaS platform and that authorizes the first client account to use a communication service provided by the SaaS platform.

The method wherein the client asset comprises a second authorization token that is provided by a third-party service provider and that authorizes use of a communication service provided by the third-party service provider.

The method wherein the communication operation comprises at least one of a voice call operation, a messaging operation, an email operation, a video operation, or a chat operation.

The method further comprising: receiving, via a third API call associated with the first client account, a third request to modify the one or more conditions related to the trusted relationship; determining whether the first client account is authorized to modify the one or more conditions related to the trusted relationship; and responsive to determining that the first client account is authorized to modify the one or more conditions related to the trusted relationship, modifying the one or more conditions related to the trusted relationship based on the third request.

The method further comprising: receiving, via a fourth API call associated with the first client account, a fourth request to revoke the trusted relationship between the first client account and the second client account; determining whether the first client account is authorized to revoke the trusted relationship between the first client account and the second client account; and responsive to determining that the first client account is authorized to revoke the trusted relationship, modifying, in the data store, the indication of the trusted relationship to indicate that the trusted relationship between the first client account and the second client account has been revoked.

The method wherein the client asset is a first client asset, the method further comprising: receiving, via a fifth API call associated with the first client account, a fifth request to share, with the second client account, a second client asset associated with the first client account; determining whether the fifth request satisfies the one or more conditions related to the trusted relationship; and responsive to determining that the fifth request satisfies the one or more conditions related to the trusted relationship, modifying the indication of the trusted relationship between the first client account and the second client account in the data store, the modified indication to indicate that the second client asset associated with the first client account is permitted to be shared with the second client account.

The method of claim 1, wherein the client asset is a first client asset, the method further comprising: receiving, via a sixth API call associated with the second client account, a sixth request to generate a third client asset based on the first client asset associated with the first client account; generating the third client asset based on the first client asset associated with the first client account; and storing, in the data store, the third client asset and an indication that the third client asset is associated with the second client account.

A further aspect of the disclosure provides a system comprising: a memory; and a processing device, coupled to the memory, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
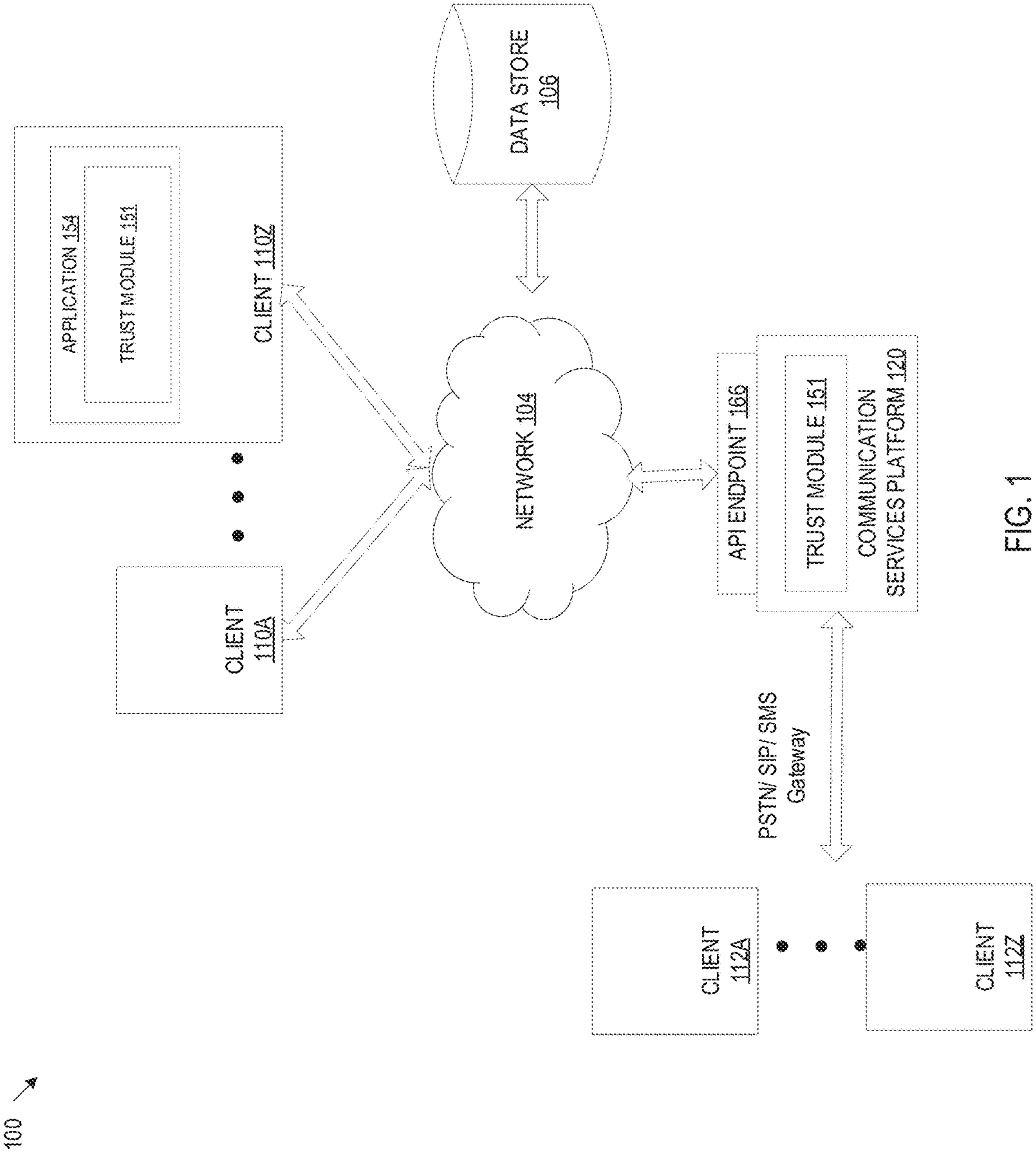
FIG. 1 illustrates an example system architecture, in accordance with some embodiments of the disclosure.

As noted above, sensitive data can include classified information that is to be protected and/or that is to be inaccessible to outside parties unless specifically granted permission. Controlling access to sensitive data among client accounts of a communication services platform, such as a Software as a Service (SaaS) platform can be particularly challenging.

In a SaaS platform, clients (e.g., organizations, entities, etc.) can be given great flexibility to create and organize client accounts (also referred to as "account(s)" herein) in a manner that is suitable and specific to the client. A client account in a SaaS platform can be used to access or subscribe to one or more services of the SaaS platform, such as communication services hosted by the SaaS platform. The client account and associated services are typically accessible by multiple users associated with the client account.

For example, a first organization may create and use multiple primary client accounts of the SaaS platform, where each primary account can be used by a different department (e.g., human resources, finance, engineering, etc.) of the organization. Each client account of the first organization can include sensitive data (e.g., an employer identification number, financial information, etc.) pertaining to the respective department of the first organization. A second organization, such as an independent software vendor (ISV), can create multiple primary client accounts for each of the ISV's customers (e.g., organizations) such that each of the ISV's client accounts include sensitive data (e.g., employer identification numbers, financial information, etc.) related to different customers (e.g., different independent organizations). The first organization may want to share some sensitive data, but not all sensitive data, between some client accounts, while the second organization may want to prohibit sharing of all sensitive data between client accounts.

Allowing such flexibility in the organization/structure of client accounts in a platform, and in particular a SaaS platform, can make sharing sensitive data between client accounts particularly challenging at least because each instance of sensitive data sharing among client accounts having a non-standard client account organization/structure can require a unique sharing solution.

Aspects of the disclosure address the above-mentioned and other challenges by facilitating adaptable sharing of client assets in a SaaS platform, and in particular, a SaaS platform hosting communication services such as voice services, messaging services (e.g., SMS services or MMS services), email services, video services, chat messaging services (e.g., internet-based chat messaging services), or a combination thereof. Specifically, aspects of the disclosure provide features that allow client assets to be shared among different client accounts while maintaining integrity of sensitive data and while providing clients with flexibility in customizing the structure of their accounts. In some implementations, the client assets can be shared among different client accounts irrespective of whether the client accounts are associated with the same organization or different organizations (e.g., client accounts of two distinct companies that have undergone a merger or have established a business partnership).

One or more application programming interfaces (APIs) can be used to enable communication between the SaaS platform and client systems. In some embodiments, the SaaS platform can receive an API call associated with a first client account to establish a trusted relationship with a second client account. The trusted relationship can enable sharing of one or more client assets with one or more other client accounts of the SaaS platform. The client assets can include but are not limited to, sensitive data such as authorization tokens used to authorize an account to access and/or use a particular communication service provided or hosted by the SaaS platform. The SaaS platform can determine whether the request satisfies one or more conditions related to the trusted relationship. For instance, the conditions can define whether a client account is permitted to establish a trusted relationship with another client account(s) and/or whether a particular client asset is permitted to be shared with a particular client account(s).

If the SaaS platform determines that the request satisfies one or more conditions related to the trusted relationship, the SaaS platform can store an indication of the trusted relationship between the first client account and the second client account in the data store. Once the trusted relationship is established, the SaaS platform can receive an API call from the second client account requesting a performance of a communication operation based on the shared client asset owned by the first client account (where the client asset is permitted to be shared based on the established trusted relationship). The SaaS platform can perform the communication operation on behalf of the second client account using the client asset of the first client account.

In an illustrative example, a first client account establishes a trusted relationship with a second client account to share a third-party authorization token of the first client account. The third-party authorization token can be used to authorize an account to send text messages from the SaaS platform to various client devices using a particular telecommunication network. A client device related to the second client account can send an API call to the SaaS platform requesting text messages be sent to various telephone numbers (e.g., 10-digit long codes (10 DLCs)) using the third-party authorization token of the first client account. The SaaS platform can determine whether an indication that the trusted relationship between the first client account and the second client account to share the third-party authorization token of the first client account has been stored in the data store. If the indication is stored in the data store, the SaaS platform can send the text messages to the various 10 DLCs on behalf of the second client account using the third-party authorization token of the first client account.

In some embodiments, client accounts can have granular control over the sharing of client assets and can change the conditions for establishing a trusted relationship with respect to particular client accounts or particular client assets. The SaaS platform can receive an API call from the first client account to modify one or more conditions related to the trusted relationship. The SaaS platform can determine whether the first client account is authorized to modify the conditions related to the trusted relationship. Responsive to determining the first client account is authorized to modify the conditions related to the trusted relationship, the SaaS platform can modify the conditions in a manner specified by the API request.

In an illustrative example, a client device associated with the first client account can send an API call to the SaaS platform requesting that the second client account be permitted to establish a trusted relationship with the first client account to share asset A but not asset Z. The request can further identify that only particular administrators (e.g., user accounts) of either the first client account or second client account are permitted to modify the conditions for establishing the trusted relationship. Once the SaaS platform determines that the first client account is authorized to modify the conditions related to the trusted relationship and, in particular the trusted relationship with the second client account, the SaaS platform modifies the conditions of the trusted relationship with the second client account and stores an indication of the modified conditions in the data store.

As noted, a technical problem addressed by embodiments of the disclosure is the security related to exposing sensitive data among client accounts of a platform, and in particular among client accounts of a SaaS platform allowing a flexible account organization/structure.

A technical solution to the above identified technical problem may include establishing a trusted relationship between particular client accounts to allow sharing of a specific client asset while preventing sharing of other client assets. The trusted relationship can be established upon receiving, via an API call associated with a first client account of the SaaS platform, a first request to establish a trusted relationship with a second client account of the SaaS platform with respect to a client asset associated with the first client account, and determining that the first request satisfies one or more conditions related to the trusted relationship.

Another technical solution to the above identified technical problem includes allowing client control over conditions that are used to determine whether to establish a trusted relationship with particular client accounts or with respect to particular client assets, thereby providing more granularity on what client assets should be permitted to be shared and between what client accounts.

Thus, the technical effect may include improving the security related to exposing sensitive data of a particular client account among other client accounts. Further, the technical effect may include reducing the amount of resources (e.g., compute resources, storage resources, network bandwidth, etc.) that are used to share client assets in contrast to creating duplicative client assets for different client accounts if sharing of client assets were not permitted by a technical solution. Further technical effects may include allowing client devices to modify the conditions that permit the sharing of client assets among client accounts using API calls.

FIG. 1 illustrates an example system architecture 100, in accordance with some embodiments of the disclosure. The system architecture 100 (also referred to as "system" herein) includes a communication services platform 120, a data store 106, client devices 110A-110Z connected to a network 104, and client devices 112A-112Z communicatively coupled to communication services platform 120.

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 106 is a persistent storage that is capable of storing data as well as data structures to tag, organize, and index the data. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by communication services platform 120 or one or more different machines coupled to the communication services platform 120 via the network 104.

The client devices 110A-110Z (generally referred to as "client device(s) 110" herein) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 110 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client devices 110A through 110Z may also be referred to as "user devices."

In some embodiments, a client device, such as client device 110Z, can implement or include one or more applications, such as application 154 (also referred to as "client application 154" herein) executed at client device 110Z. In some embodiments, application 154 can be used to communicate (e.g., send and receive information) with communication services platform 120. In some embodiments, application 154 can implement user interfaces (e.g., graphical user interfaces (GUIs)) that may be webpages rendered by a web browser and displayed on the client device 110Z in a web browser window. In another implementation, the user interfaces of client application 154 may be included in a stand-alone application downloaded to the client device 110Z and natively running on the client device 110Z (also referred to as a "native application" or "native client application" herein).

In some embodiments, client devices 110 can communicate with communication services platform 120 using one or more function calls, such as application programming interface (API) function calls (also referred to as "API calls" herein). For example, the one or more function calls can be identified in a request using one or more application layer protocols, such a HyperText Transfer Protocol (HTTP) (or HTTP secure (HTTPS)), and that are sent to the communication services platform 120 from the client device 110Z implementing application 154. The communication services platform 120 can respond to the requests from the client device 110Z by using an application layer protocol.

In some embodiments, one or more of client devices 110 can be identified by a uniform resource identifier (URI), such as a uniform resource locator (URL). For example, communication services platform 120 can send an API call to client device 110Z addressed to a URL specific to the client device 110Z. In some embodiments, the communication services platform 120 can be identified by a URI. For instance, the API call sent by a client device 110 to communication services platform 120 can be directed to the URL of communication services platform 120.

In some embodiments, client devices 112A-112Z (generally referred to as "client device(s) 112" herein) may be similar to client devices 110. In some embodiments, client devices 112 can include one or more telephony devices. A telephony device can include a Public Switched Telephone Network (PSTN)-connected device, such as a landline phone, cellular phone, or satellite phone, for example. In some embodiments, a telephony device can also include an internet addressable voice device (e.g., non-PSTN telephony device), such as Voice-Over-Internet-Protocol (VOIP) phones, or Session Initiation Protocol (SIP) devices, for example. In some embodiments, a telephony device can include one or more messaging devices, such as a Short Message Service (SMS) network device that, for example, uses a cellular service to exchange SMS messages or Multimedia Messaging Service (MMS) messages.

In some embodiments, the communication services platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, communication services platform 120 may include a plurality of computing devices that together may comprise a hosted computing resource, a grid computing resource or any other distributed computing arrangement. In some embodiments, communication services platform 120 may correspond to an elastic computing resource where the allotted capacity of processing, network, storage, or other computing-related resources may vary over time.

In some embodiments, communication services platform 120 provides one or more API endpoints 166 that can expose services, functionality or content of the communication services platform 120 to one or more of client devices 110. In some embodiments, an API endpoint can be one end of a communication channel, where the other end can be another system, such as a client device 110Z. In some embodiments, the API endpoint can include or be accessed using a resource locator, such a universal resource locator (URL), of a server or service. The API endpoint can receive requests from other systems, and in some cases, return a response with information responsive to the request. In some embodiments, HTTP or HTTPS methods can be used to communicate to and from API endpoint 166.

In an illustrative example, used for illustration rather than limitation, communication services platform 120 can include a Software as a Service (SaaS) platform that can at least in part provide one or more services, such as communication services, to one or more clients. The SaaS platform may deploy services, such as software applications, to one or more clients for use as an on-demand service. For example, the SaaS platform may deliver and/or license software applications on a subscription basis while also hosting, at least in part, the software application. The licensed software applications can, at least in part, be hosted on the infrastructure, such as the cloud computing resources of the SaaS platform.

In some embodiments, communication services platform 120, as noted above, can provide communication services that include, but are not limited to, voice services, messaging services (e.g., SMS services or MMS services), email services, video services, chat messaging services (e.g., internet-based chat messaging services), or a combination thereof. Communication operations using the communication services can use one or more of a communication network (e.g., Internet), telecommunications network (e.g., such as a cellular network, satellite communication network, or landline communication network), or a combination thereof, to transfer communication data between parties.

In some embodiments, communication services platform 120 and/or client devices 110 include an instance of trust module 151. In some embodiments, trust module 151 hosted by communication services platform 120 and/or trust module 151 of client device 110Z can perform one or more aspects of the disclosure.

In some embodiments, communication services platform 120 can include a multitenant system. Multitenancy can refer to a mode of operation of software applications where multiple independent instances of one or multiple applications operate in a shared computer environment. In some embodiments, the instances (tenants) can be logically isolated, but physically integrated. The degree of logical isolation can be complete, but the degree of physical integration can vary. The tenants (application instances) can be representations of organizations that obtain access to the multitenant system. The tenants may also be multiple applications competing for shared underlying resources. Multiple organizations can access the resources of communication services platform 120 without any indication that the resources are shared between the multiple organizations. The data of each of organizations can be logically isolated from one another such that each organization has access to their own data but not the data of other organizations in the multitenant system. In some embodiments, communication services platform 120 can include a single tenant system.

An organization can be an example of an entity, such as a legal entity, that includes multiple people and that has a particular purpose. A non-limiting example of an organization includes a corporation (e.g., authorized by law to act as a single entity or legal entity). In some embodiments, multiple organizations can include one or more organizations that are independent or distinct from the other organizations. For example, a first organization can be corporation A and a second organization can be corporation B. Corporation A can be considered an independent legal entity from corporation B. Each of corporation A and corporation B can make independent decisions and have a different legal or corporate structure.

In some embodiments, a "user" may be represented as a single individual. However, other embodiments of the disclosure encompass a "user" being an entity controlled by a set of users and/or an automated source. For example, a set of individual users federated as one or more departments in an organization may be considered a "user." In general, functions described in one embodiment as being performed by the communication services platform 120 can also be performed on the client devices 110A through 110Z in other embodiments (and vice versa), if appropriate. In addition, the functionality attributed to a particular component can be performed by different or multiple components operating together. The communication services platform 120 can also be accessed as a service provided to other systems or devices through appropriate application programming interfaces.

Although embodiments of the disclosure are discussed in terms of communication service platforms, embodiments may also be generally applied to any type of platform, system or service.

In situations in which the systems discussed here collect personal information about users, or may make use of personal information, the users may be provided with an opportunity to control whether the communication services platform 120 collects user information, or to control whether and/or how to receive content from the communication services platform 120 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the communication services platform 120.

Figure 2:
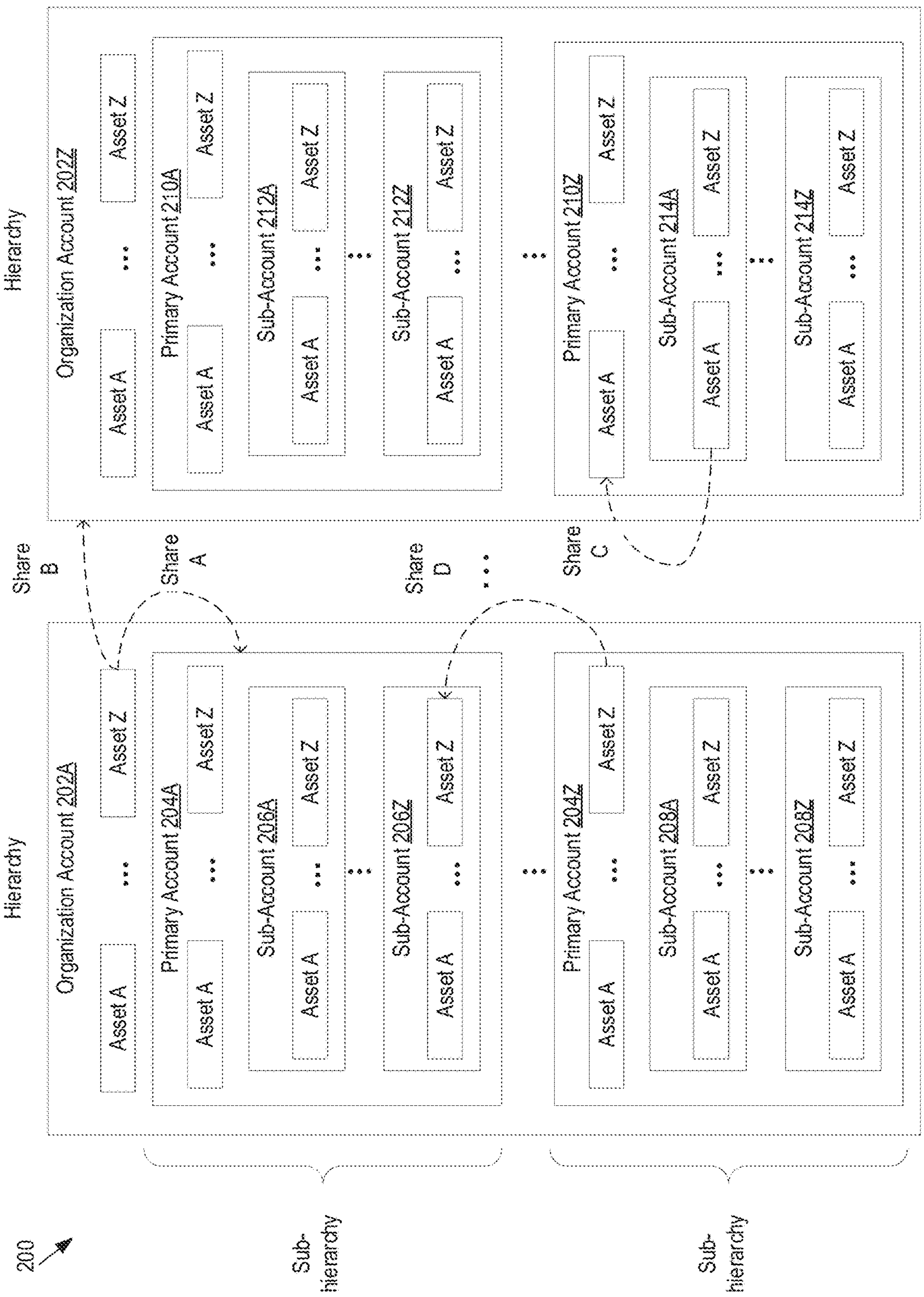
FIG. 2 is a diagram of an example account structure implemented by a communication services platform, in accordance with embodiments of the disclosure.

FIG. 2 is a diagram of an example account structure implemented by communication services platform, in accordance with embodiments of the disclosure. Diagram 200 illustrates an exemplary account structure that can be implemented by communication services platform 120 in some embodiments. It can be appreciated that other account structures can be used in accordance with aspects of the disclosure without loss of generality.

In some embodiments, an account of communication services platform 120 can be used to access or subscribe to one or more communications services of communication services platform 120. An account (also referred to as a "service account" or "client account" herein) can be accessible and/or associated with one or more users. For example, a particular entity, such as an organization may create an account at the communication services platform 120. The entity can subscribe to an instance of a voice service (e.g., voice application) and an instance of a video service. The organization may associate different users (e.g., employees) with the account such that each user can access the account. A service account can be associated with multiple user accounts. For instance, multiple users via user accounts can access the service account of the entity. In some embodiments, each user account associated with a service account can have a different permission level with respect to access and control over the associated service account. In some embodiments, a service account is not the same as (e.g., is different from) a user account. Account as referenced herein shall refer to a service account (e.g., client account), unless otherwise indicated.

In some embodiments, the accounts of communication services platform 120 can be configured in a hierarchy of accounts, as illustrated in diagram 200. For example, diagram 200 shows a three-tiered ranking of accounts for purposes of illustration, rather than limitation. In other embodiments, any number of ranked tiers or levels of accounts can be implemented. In still other embodiments, a flat non-hierarchical account structure can be implemented.

In diagram 200, the highest ranked account is the organization account, illustrated by organization account 202A through organization account 202Z (generally referred to as "organization account(s) 202" herein), the second highest ranked account is the primary account, illustrated by primary account 204A through primary account 204Z (generally referred to as "primary account(s) 204" herein), and the lowest ranked account is the sub-account, illustrated by sub-account 206A through 206Z (generally referred to as "sub-account(s) 206" herein).

In some embodiments, the organization account 202A is the highest ranked account in the first hierarchy of accounts. The first hierarchy of accounts includes organization account 202A, primary accounts 204A through 204Z, and sub-accounts 206A through 206Z and sub-accounts 208A through 208Z. The organization account 202Z is the highest ranked account in the second hierarchy of accounts, which is different than the first hierarchy.

In some embodiments, primary account 204A is the second ranked account and primary account 204Z is also a second ranked account of the first hierarchy (e.g., accounts of the same rank). Primary account 204A and associated sub-accounts 206A through 206Z represent a first sub-hierarchy. Primary account 204Z and associated sub-accounts 208A through 208Z represent a second sub-hierarchy, which is different than the first sub-hierarchy In some embodiments, the highest ranked account can have some authority (e.g., control and/or access over the data, assets, or services therein) over at least a directly lower-ranked account within the same hierarchy. For example, organization account 202A may have some authority over primary accounts 204A through 204Z.

In some embodiments, the highest ranked account may have authority over an indirectly lower-ranked account. In some embodiments, a higher ranked account may not have authority over an indirectly lower-ranked account within the same hierarchy. For example, organization account 202A may not have authority over sub-account 206A through 206Z or sub-account 208A through 208Z.

In some embodiments, the highest ranking account can have some authority of a lower ranking account in the same sub-hierarchy, but not in a different sub-hierarchy in the same hierarchy. For example, primary account 204A can have some authority over sub-account 206A through 206Z, but may not have authority over sub-account 208A through 208Z.

In some embodiments, accounts of one hierarchy have no authority over accounts in a different hierarchy irrespective of rank. For example, no accounts of the hierarchy associated with organization account 202A have authority over any accounts of hierarchy associated with organization account 202Z, and vice versa.

In some embodiments, accounts of the same level in the same hierarchy may not have authority over one another. For example, primary account 204A may not have authority over primary account 204Z, and vice versa.

In some embodiments, each account can be associated with one or more assets (also referred to as "client assets" herein) represented by assets A through Z. In some embodiments, assets are not allowed to be shared between accounts without a trusted relationship, as described herein. In some embodiments, assets can include one or more authorization tokens that authorize an account to access and use a particular service, such as a communication service provided or hosted by communication services platform 120. An authorization token can be a software or hardware object that is used to authorize a particular account to access and use a service, such as a communication service. In some embodiments, an authorization token can be used to provide, to an account, more granular authorization privileges such as particular features of a service or a particular type of use of a service. In some embodiments, an account can have a specific authorization token for each service (or each instance of a service) that the account is authorized to access and use.

In some embodiments, communication services platform 120 can generate and/or grant authorization tokens (e.g., first-party authorization tokens) that authorize a client account to access and use a particular service or instance of a particular service. For example, an account can be granted a first-party authorization token by the communication services platform 120 to authorize the account to use an instance of a voice service hosted by the communication services platform 120.

In some embodiments, assets can include an authorization token (e.g., a third-party authorization token) that authorizes an account to access and use a particular communication service provided by a third-party, such as a third-party service provider. A third party can refer to an entity, such as organization or business (e.g., a different legal entity than communication services platform 120) that is distinct from another entity, such as the entity controlling or owning the communication services platform 120.

For example, the communication services platform 120 can offer message services (e.g., SMS) over a telephone number. To send messages using the message service of the communication services platform 120, the client account may obtain a third-party authorization token from a telecommunication carrier to authorize the client account to use the carrier's telecommunication network for such purpose. The communication services platform 120 can be a different entity than the telecommunication carrier. In order to send a message, the account may use the third-party authorization token to use the telecommunication network and a first-party authorization token from the communication services platform 120 to use the message service of the communication services platform 120.

In some embodiments, the assets can include other sensitive or privileged information associated with a particular account. For example, the sensitive information (also referred to as "sensitive data" herein) can include, but is not limited to, employer identification numbers (EIN), personal data, financial data, health data, identifying data of an individual or organization, among others. Examples of assets are used for illustration, rather than limitation, and other types of assets are within the scope of the disclosure.

Methods 300, 350, and/or 375 and/or each of the methods 300's, 350's or 375's individual functions, routines, subroutines, or operations can be performed by a processing device, having one or more processing units (CPU) and memory devices communicatively coupled to the CPU(s). In some embodiments, methods 300, 350, and/or 375 can be performed by a single processing thread or alternatively by two or more processing threads, each thread executing one or more individual functions, routines, subroutines, or operations of the method. The methods 300, 350, and 375 as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, methods 300, 350, and 375 are performed by trust module 151 described in FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1 and FIG. 2 may be used herein to help describe FIG. 3A-3C.

Figure 3A:
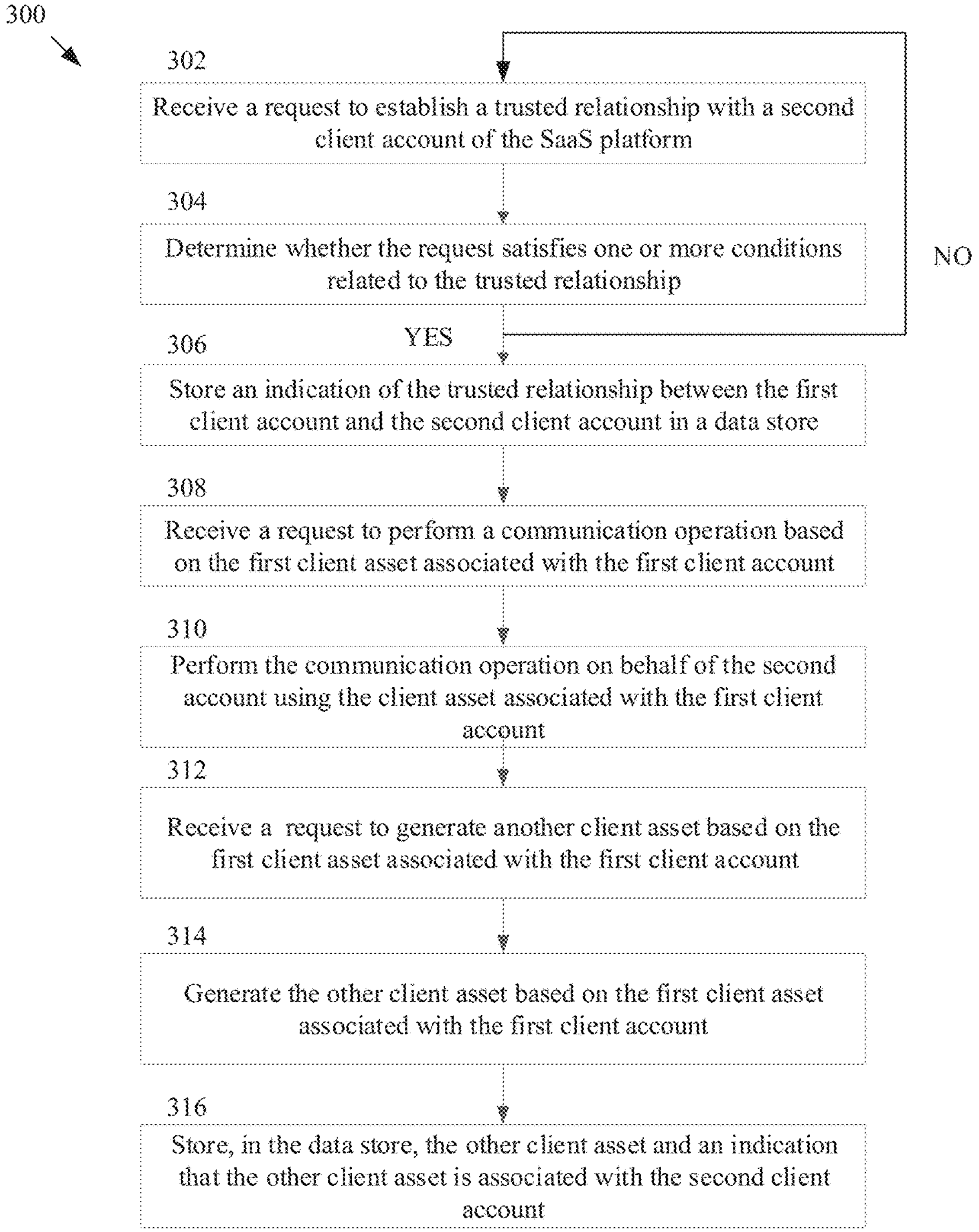
FIG. 3A depicts a flow diagram of an example method of establishing a trusted relationship between accounts of the communication services platform to share one or more assets, in accordance with embodiments of the disclosure.

FIG. 3A depicts a flow diagram of an example method 300 of establishing a trusted relationship between accounts of the communication services platform to share one or more assets, in accordance with embodiments of the disclosure.

At operation 302, processing logic receives a request associated with a first client account of a SaaS platform to establish a trusted relationship with a second client account of the SaaS platform. In some embodiments, the request is via an API call associated with the first client account of the SaaS platform. In some embodiments, the trusted relationship enables sharing, with the second client account, of a client asset associated with the first client account. For purposes of illustration, rather than limitation, the request to establish a trusted relationship is with a single client account. In other embodiments, the request can be for establishing a trusted relationship with multiple client accounts to share one or more client assets.

In some embodiments, the client asset includes an authorization token that is provided by the SaaS platform and that authorizes the first client account to use a communication service provided by the SaaS platform. In some embodiments, the client asset includes an authorization token that is provided by a third-party service provider and that authorizes use of a communication service provided by the third-party service provider.

In an illustrative example, a client device associated with organization account 202A can send an API call to communication services platform 120 requesting to establish a trusted relationship between organization account 202A and primary account 204A to share asset Z of organization account 202A (e.g., Share A).

In some embodiments, the owner (e.g., particular account) of the asset is permitted to establish (and request to establish) a trusted relationship to share an asset with another client account. In some embodiments, a non-owner account of communication services platform 120 is permitted to establish (and request to establish) a trusted relationship to share an asset owned by another account. For example, a client device representing sub-account 206Z can request to establish a trusted relationship with primary account 204Z to share asset Z of primary account 204Z with sub-account 206Z (e.g., share D).

In some embodiments, the request to establish a trusted relationship to share asset(s) can be a general request to share all assets associated with a particular account. For example, a client device associated with organization account 202A can send an API call to communication services platform 120 requesting to establish a trusted relationship between organization account 202A and primary account 204A to share assets A through Z of organization account 202A.

In some embodiments, the request to establish a trusted relationship to share asset(s) can be a specific request to share specific assets associated with a particular account. For example, a client device associated with organization account 202A can send an API call to communication services platform 120 requesting to establish a trusted relationship between organization account 202A and primary account 204A to share only asset A of organization account 202A (e.g., Share A). In some embodiments, the request can indicate whether the request is a specific request or a general request. In some embodiments, the specific request can indicate the specific asset(s) to be shared in the trusted relationship.

In some embodiments, establishing a trusted relationship to share an asset with another account can depend on the rank of the account. For example, only a higher ranked (or same ranked accounts) can request to establish a trusted relationship to share an asset with another account. In some embodiments, establishing a trusted relationship to share an asset with another account is rank agnostic (e.g., independent or irrespective of account rank). For example, sub-account 214A can request to establish a trusted relationship to share asset A of sub-account 214A with primary account 210Z (e.g., share C) and, upon satisfaction of one or more conditions, share asset A of sub-account 214A with primary account 210Z.

In some embodiments, a trusted relationship can be established between accounts in the same hierarchy. In some embodiments, a trusted relationship can be established between accounts in different hierarchies. For example, a client device associated with organization account 202A can request to establish a trusted relationship with organization account 202Z to share asset Z of organization account 202A with organization account 202Z (e.g., share B).

At operation 304, processing logic determines whether the first request satisfies one or more conditions related to the trusted relationship. In some embodiments, the one or more conditions can be defined in a policy. In some embodiments, the one or more conditions are general conditions that apply to any trusted relationship between any accounts. In some embodiments, the one or more conditions are specific conditions that apply specifically to one or more of the owner of the asset (e.g., owning account), the borrower of the asset (borrowing account(s)), or the asset to be shared. In some embodiments, the one or more conditions can be a combination of general conditions and specific conditions. In some embodiments, the conditions can be modified as further described with respect to FIG. 3B.

In an illustrative example, responsive to receiving a request from a client device associated with organization account 202A to establish a trusted relationship with primary account 204A to share asset Z of organization account 202A with primary account 204A (e.g., share A), communication services platform 120 can determine that the general conditions specify that any higher ranked account can share any asset with a lower ranked account in the same hierarchy, and asset Z can be shared. In another example where specific conditions are implemented, the communication services platform 120 can determine that organization account 202A is not permitted to share any assets with primary account 204A (but can share assets with other primary accounts, such as primary account 204Z). As such, asset Z cannot be shared in accordance with the specific conditions. In still another example where specific conditions are implemented, communication services platform 120 can determine that organization account 202A is permitted to share asset Z, but not asset A, with primary account 204A. As such, asset Z of organization account 202A can be shared with primary account 204A.

If the request does not satisfy the one or more conditions related to the trusted relationship, processing logic can return to operation 302. If the request does satisfy the one or more conditions related to the trusted relationship, processing logic can proceed to operation 306.

At operation 306, processing logic stores an indication of the trusted relationship between the first client account and the second client account in a data store. In some embodiments, processing logic can store an indication in a record (e.g., data structure) that indicates that a trusted relationship between the first client account and the second client account has been established to share a specific (or all) assets associated with (e.g., owned by) the first client account.

At operation 308, processing logic receives a request to perform a communication operation based on the client asset associated with the first client account. In some embodiments, the request is via an API call associated with the second client account.

In some embodiments, the communication operation includes at least one of a voice call operation (e.g., associated with a voice service), a messaging operation (e.g., associated with a messaging service), an email operation (e.g., associated with an email service), a video operation (e.g., associated with a video service), or a chat operation (e.g., associated with a chat service).

At operation 310, processing logic performs the communication operation on behalf of the second account using the client asset associated with the first client account. In some embodiments, performing the communication operation is further based on the indication of the trusted relationship between the first client account and the second client account.

In an illustrative example, the organization account 202A establishes a trusted relationship with primary account 204A to share asset Z of organization account 202A. Asset Z can include a third-party authorization token that authorizes organization account 202A to send text messages from communication services platform 120 to various client devices using a particular telecommunication network. For instance, text messages can be sent as part of an application-to-person messaging (A2P) service that sends messages, such as SMS messages, from a software application to one or more client devices, such as mobile devices. The recipient client devices can be identified by telephone numbers, such as 10-digit long codes (10 DLCs). A client device related to primary account 204A can send an API call to communication services platform 120 requesting to send text messages (e.g., A2P messaging) to various telephone numbers (e.g., 10 DLCs) using the third-party authorization token of organization account 202A. Communication services platform 120 can determine whether an indication of a trusted relationship between organization account 202A and primary account 204A to share the third-party authorization token of organization account 202A has been stored in the data store. If the indication is stored, communication services platform 120 can send the text messages to the various 10 DLCs on behalf of the primary account 204A using the third-party authorization token (and in some cases a first-party authentication token that authorizes primary account 204A to use the messaging service of communication services platform 120 to send the messages).

As noted above, the request to establish a trusted relationship can be a general request or a specific request. In embodiments where a specific request is issued, additional specific requests can be issued to establish a trusted relationship between the same accounts (or different accounts) to share different assets. For example, in some embodiments processing logic receives an additional request (e.g., via an API call associated with the first client account) to share, with the second client account, a second client asset associated with the first client account. In some embodiments, processing logic determines whether the additional request satisfies the one or more conditions related to the trusted relationship. Responsive to determining that the additional request satisfies the one or more conditions related to the trusted relationship, processing logic modifies the indication of the trusted relationship between the first client account and the second client account in the data store. The indication can be modified to indicate that, in addition to the first client asset, the second client asset associated with the first client account is also permitted to be shared with the second client account.

In some embodiments, a client asset that is permitted to be shared between client accounts in accordance with the trusted relationship can only be used with respect to a particular business activity or type message (e.g., "campaign"). For example, an authorization token that is permitted to be shared between client accounts associated with a company can only be used to request communication operations in relation to a particular business activity (e.g., food delivery). If there is a need for communication operations to be performed in relation to a different business activity (e.g., advertising), a new authorization token may be needed. As will be discussed in more detail below, in order to simplify the process, a new authorization token can be generated based on the existing authorization token.

At operation 312, processing logic receives a request to generate a new client asset based on the first client asset associated with the first client account. In some embodiments, the request is received via an API call associated with the second client account.

At operation 314, processing logic generates the new client asset based on the first client asset associated with the first client account.

At operation 316, processing logic stores, in the data store, the new client asset and an indication that the third client asset is associated with the second client account.

In an example, the organization account 202A establishes a trusted relationship with primary account 204A to share asset Z of organization account 202A. Asset Z can include a third-party authorization token that authorizes organization account 202A to send text messages from communication services platform 120 to various client devices using a particular telecommunication network. Primary account 204A can send a request communication services platform 120 to authorize the primary account 204A to send a particular type of message (e.g., a particular message campaign that sends messages to client devices indicating that packages have been delivered) over the telecommunication network using the third-party authorization token shared by organization account 202A. Communication services platform 120 can determine whether primary account 204A is permitted to send the particular type of messages, and if the primary account 204A is permitted to send the particular type of messages, communication services platform 120 can generate a new authorization token authorizing the primary account 204A to send the particular type of messages. The new authorization token can be stored in the data store and associated with the primary account 204A. In some instances, communication services platform 120 can also monitor the messages sent (or to be sent) to detect whether the message content aligns with the type of messages (e.g., campaign) for which the new authorization token was granted. The new authorization token may be revoked if communication services platform 120 sends (or intends to send) a threshold number of messages that do not correspond to the type of messages for which the new authorization token was granted.

Figure 3B:
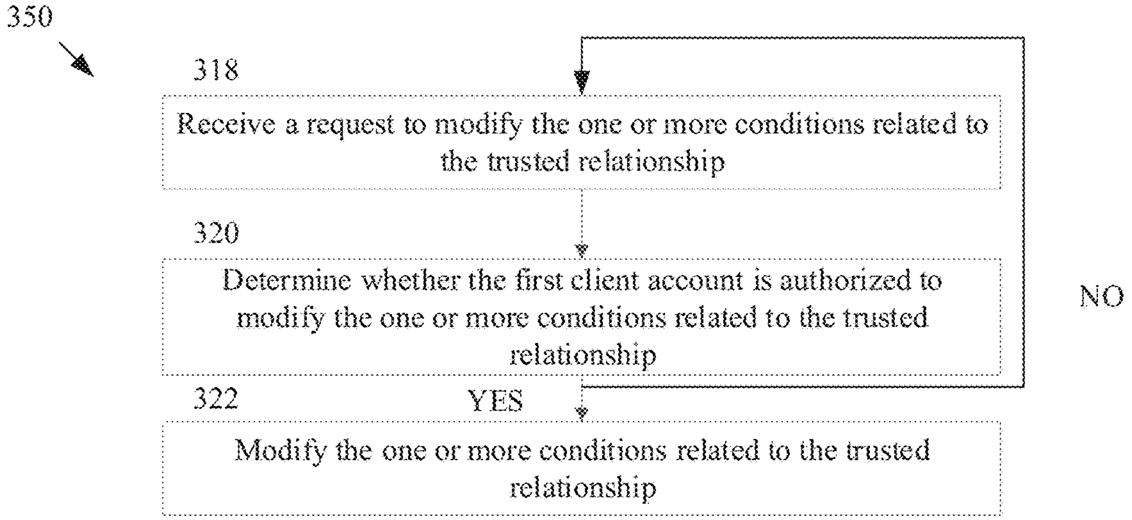
FIG. 3B depicts a flow diagram of an example method of modifying one or more conditions related to a trusted relationship, in accordance with embodiments of the disclosure.

FIG. 3B depicts a flow diagram of an example method 350 of modifying one or more conditions related to a trusted relationship, in accordance with embodiments of the disclosure. In some embodiments, a particular account can control the conditions under which assets belonging to the account are shared. In some embodiments, the control can be granular as further described below.

At operation 318 of method 350, processing logic receives a request to modify (e.g., add, remove, or change/edit) the one or more conditions related to the trusted relationship. In some embodiments, the request is received via an API call associated with the first client account. In some embodiments, the request can identify one or more parameters specifying the one or more conditions to be modified. In some embodiments, the request can include parameters that identify one or more other accounts for which one or more conditions are to be modified. In some embodiments, the request can include parameters that identify one or more assets of the first client account that are permitted to be shared. In some embodiments, the request can include parameters that identify one or more assets of the first client account that are not permitted to be shared. In some embodiments, the request can include parameters that identify one or more user accounts (associated with the permitted client accounts) that are authorized to establish a trusted relationship to share particular assets of the first client account.

At operation 320, processing logic determines whether the first client account is authorized to modify the one or more conditions related to the trusted relationship. In some embodiments, processing logic can review a policy associated with the first client account to determine whether the first user account has authorization to modify the conditions related to the trusted relationship. In some embodiments, the one or more conditions can be more granular. For example, processing logic can determine whether the user account identified in the request is authorized to modify the one or more conditions related to the trusted relationship. In another example, processing logic can determine whether one or more conditions related to a particular asset identified in the request are permitted to be modified. In another example, processing logic can determine whether the one or more accounts with which permission to establish a trusted relationship is requested are authorized to establish a trusted relationship generally or are authorized to establish a trusted relationship to share one or more particular assets.

If processing logic determines that the client account is not authorized to modify the one or more conditions related to the trusted relationship, processing logic returns to operation 318. If processing logic determines that that client account is authorized to modify the one or more conditions related to the trusted relationship, processing logic proceeds to operation 322.

At operation 322, processing logic modifies the one or more conditions related to the trusted relationship based on the request. In some embodiments, the one or more conditions are modified based on the parameters identified by the request to modify one or more conditions. The modified conditions can be stored in a record or policy associated with the first client account at the data store.

Figure 3C:
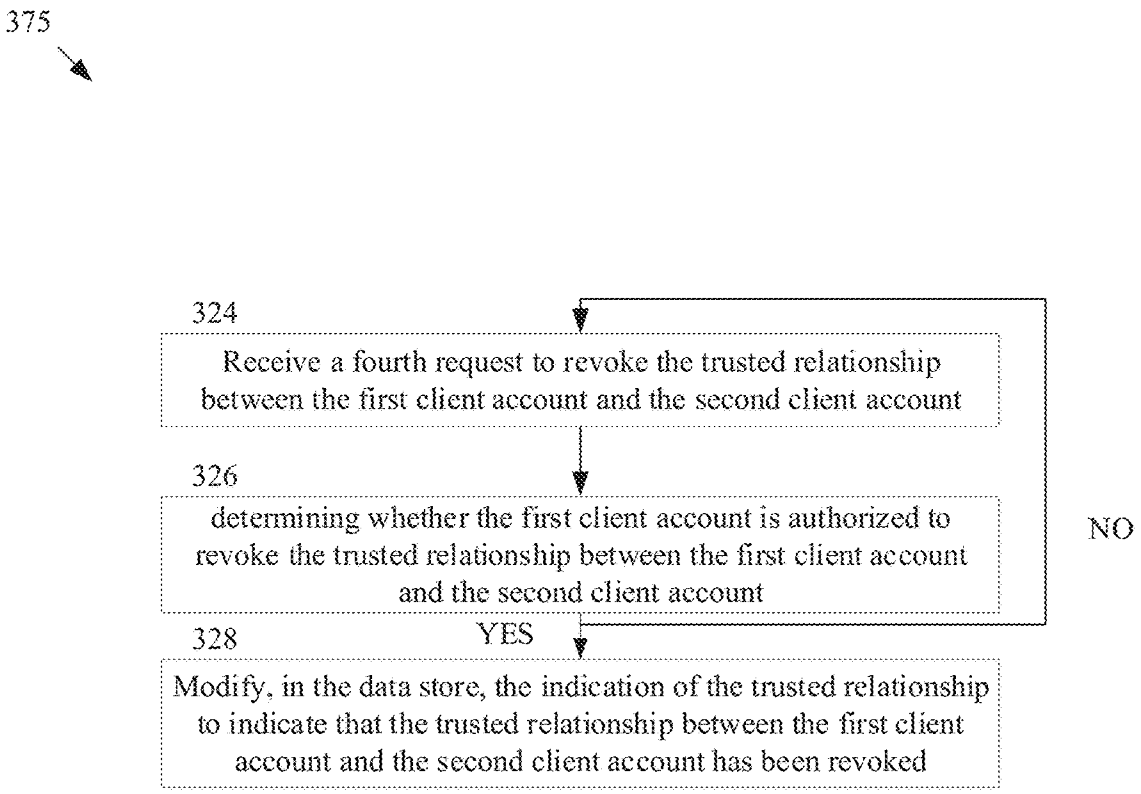
FIG. 3C depicts a flow diagram of an example method of revoking a trusted relationship between accounts of the communication services platform, in accordance with embodiments of the disclosure.

FIG. 3C depicts a flow diagram of an example method 375 of revoking a trusted relationship between accounts of the communication services platform, in accordance with embodiments of the disclosure. In some embodiments, a particular account can revoke (e.g., general revocation) a trusted relationship established between itself and one or more other client accounts (which prohibits sharing of any assets of the particular account with the other client accounts). In some embodiments, the control can be more granular. In an example, a particular account can revoke (e.g., specific revocation) a trusted relationship with another account to share a particular asset, while other assets of the particular account are still permitted to be shared with the other account.

At operation 324, processing logic receives a request to revoke the trusted relationship between the first client account and the second client account. In some embodiments, the request is made via an API call associated with the first client account.

At operation 326, processing logic determines whether the first client account is authorized to revoke the trusted relationship between the first client account and the second client account. In some embodiments, processing logic can review a policy to determine whether the first client account is authorized to revoke the trusted relationship. In some embodiments, the policy can be more granular. For example, processing logic can determine whether the particular user account associated with the request is authorized to revoke the trusted relationship. In another example, processing logic can determine whether the first client account is permitted to revoke a trusted relationship with the particular account (e.g., second client account) and/or for the particular asset(s).

If processing logic determines that the first client account is not authorized to revoke the trusted relationship between the first client account and the second client account, processing logic returns to operation 324. If processing logic determines that the first client account is authorized to revoke the trusted relationship between the first client account and the second client account, processing logic returns to operation 328.

At operation 328, processing logic modifies, in the data store, the indication of the trusted relationship to specify that the trusted relationship between the first client account and the second client account has been revoked. For example, processing logic can modify a flag or other identifier to specify that the trusted relationship between the first client account and the second client account has been revoked. If the revocation is more granular (e.g., only a trusted relationship to share a particular asset is revoked), processing logic can make a similar modification to an identifier that specifies the particular revocation at the data store.

Figure 4:
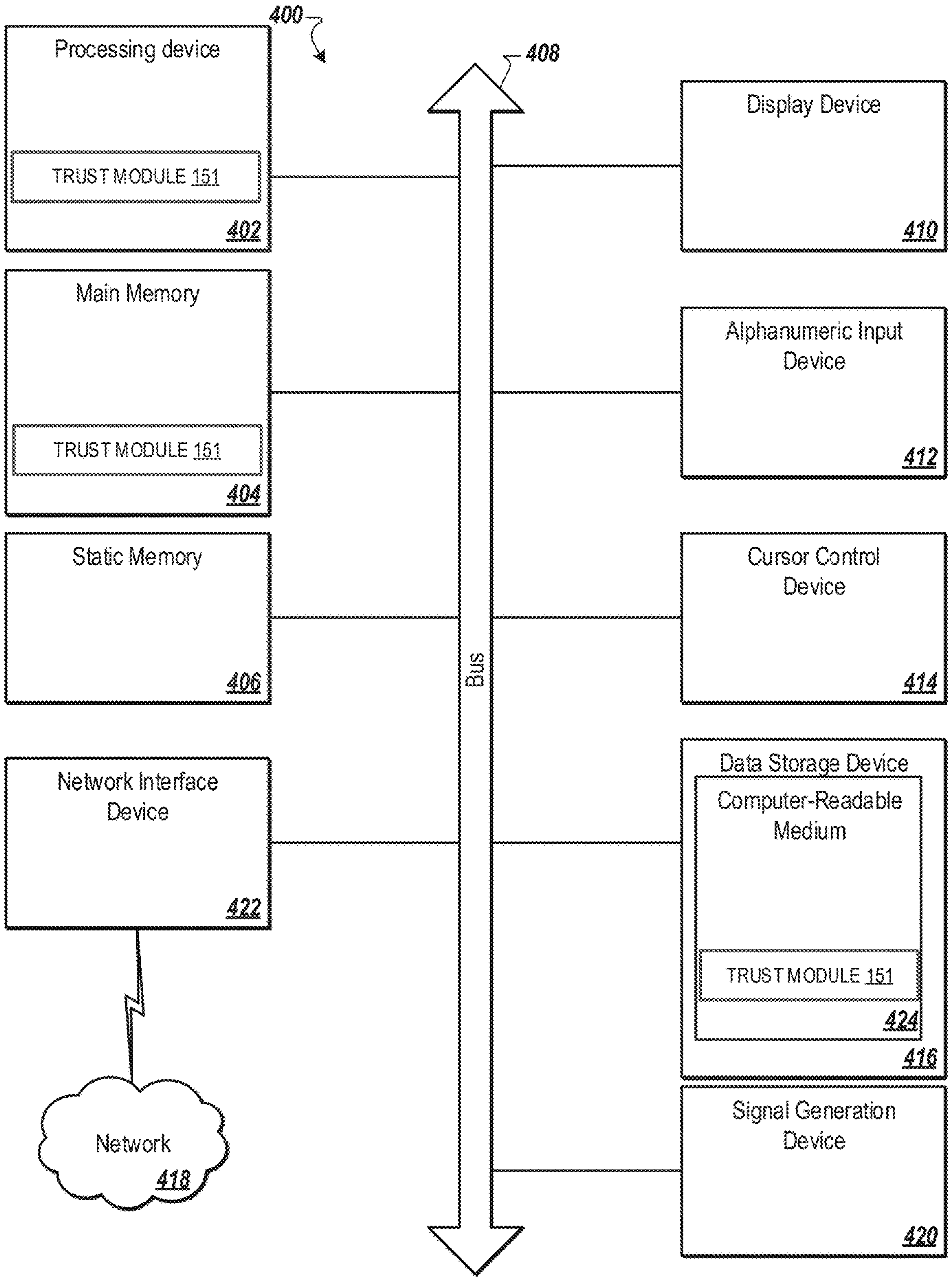
FIG. 4 is a block diagram illustrating an exemplary computer system, in accordance with some embodiments of the disclosure.

FIG. 4 is a block diagram illustrating an exemplary computer system 400, in accordance with an embodiment of the disclosure. The computer system 400 executes one or more sets of instructions that cause the machine to perform any one or more of the methodologies discussed herein. Set of instructions, instructions, and the like may refer to instructions that, when executed by computer system 400, cause computer system 400 to perform one or more operations of trust module 151. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions of the system architecture 100 and trust module 151 for performing the operations discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a non-transitory computer-readable storage medium 424 on which is stored the sets of instructions of the system architecture 100 of trust module 151 embodying any one or more of the methodologies or functions described herein. The sets of instructions of the system architecture 100 and of trust module 151 may also reside, completely or at least partially, within the main memory 404 and/or within the processing device 402 during execution thereof by the computer system 400, the main memory 404 and the processing device 402 also constituting computer-readable storage media. The sets of instructions may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method of managing a client asset in a software as a service (SaaS) platform, comprising:

configuring a plurality of client accounts in a first hierarchy of accounts, the plurality of client accounts comprising a first client account and a second client account ranked in the first hierarchy of accounts;

receiving, via a first application programming interface (API) call associated with the first client account of the SaaS platform, a first request to establish a trusted relationship with the second client account of the SaaS platform to share the client asset associated with the first client account;

determining that the first request satisfies one or more conditions related to the first hierarchy of accounts and the trusted relationship, wherein the first hierarchy of accounts comprises at least three tiers of ranked accounts including a first account tier, a second account tier ranked below the first account tier, and a third account tier ranked below the second account tier, and wherein the one or more conditions comprise a condition based on respective tiers of the first client account and the second client account within the first hierarchy of accounts;

receiving, via a second API call associated with the second client account, a second request to perform a communication operation based on the client asset associated with the first client account; and performing the communication operation on behalf of the second client account using the client asset associated with the first client account and based on an indication of the trusted relationship between the first client account and the second client account, wherein performing the communication operation comprises causing communication data to be transmitted to a recipient device associated with a telephone number, the recipient device associated with a party external to the SaaS platform.

2. The method of claim 1, wherein the plurality of client accounts subscribe to a communication service provided by the SaaS platform.

3. The method of claim 2, wherein the communication service comprises one or more of a messaging service for text messages or a voice service for voice calls.

4. The method of claim 1, further comprising:

responsive to determining that the first request satisfies the one or more conditions related to the first hierarchy of accounts and the trusted relationship, storing the indication of the trusted relationship between the first client account and the second client account.

5. The method of claim 1, wherein the first client account comprises an organization account and the second client account comprises a primary account ranked below the organization account in the first hierarchy of accounts.

6. The method of claim 1, wherein determining that the first request satisfies the one or more conditions related to the first hierarchy of accounts and the trusted relationship comprises:

determining whether the first client account and the second client account are within a same hierarchy of accounts, wherein the one or more conditions are satisfied responsive to determining that the first client account and the second client account are within the same hierarchy of accounts.

7. The method of claim 6, wherein determining that the first request satisfies the one or more conditions related to the first hierarchy of accounts and the trusted relationship comprises:

responsive to determining that the first client account and the second client account are within the same hierarchy of accounts, determining whether the first client account is ranked above the second client account in the first hierarchy of accounts, wherein the one or more conditions are satisfied responsive to determining that the first client account is ranked above the second client account in the first hierarchy of accounts.

8. The method of claim 7, wherein determining that the first request satisfies the one or more conditions related to the first hierarchy of accounts and the trusted relationship comprises:

responsive to determining that the first client account is ranked above the second client account in the first hierarchy of accounts, determining whether the second client account is a directly lower-ranked account or an indirectly lower-ranked account, wherein the one or more conditions are satisfied responsive to determining that the second client account is the directly lower-ranked account.

9. The method of claim 1, wherein performing the communication operation on behalf of the second client account using the client asset associated with the first client account and based on the indication of the trusted relationship between the first client account and the second client account comprises:

performing a text messaging operation to send one or more text messages based on the client asset comprising a third-party authorization token that authorizes using a telecommunication network of a third-party service provider to send the one or more text messages.

10. The method of claim 1, wherein the trusted relationship enables sharing of the client asset comprising a first-party authorization token that is provided by the SaaS platform and that authorizes the first client account to use a communication service provided by the SaaS platform.

11. The method of claim 1, wherein a client device of the second client account instructs the SaaS platform to cause the communication data to be transmitted to the recipient device associated with the telephone number corresponding to a telecommunication network based on the client asset comprising a third-party authorization token shared by the first client account.

12. A system for managing a client asset in a software as a service (SaaS) platform, comprising:

a memory; and a processing device, coupled to the memory, configured to perform operations comprising:

configuring a plurality of client accounts in a first hierarchy of accounts, the plurality of client accounts comprising a first client account and a second client account ranked in the first hierarchy of accounts;

receiving, via a first application programming interface (API) call associated with the first client account of the SaaS platform, a first request to establish a trusted relationship with the second client account of the SaaS platform to share the client asset associated with the first client account;

determining that the first request satisfies one or more conditions related to the first hierarchy of accounts and the trusted relationship, wherein the first hierarchy of accounts comprises at least three tiers of ranked accounts including a first account tier, a second account tier ranked below the first account tier, and a third account tier ranked below the second account tier, and wherein the one or more conditions comprise a condition based on respective tiers of the first client account and the second client account within the first hierarchy of accounts;

receiving, via a second API call associated with the second client account, a second request to perform a communication operation based on the client asset associated with the first client account; and performing the communication operation on behalf of the second client account using the client asset associated with the first client account and based on an indication of the trusted relationship between the first client account and the second client account, wherein performing the communication operation comprises causing communication data to be transmitted to a recipient device associated with a telephone number, the recipient device associated with a party external to the SaaS platform.

13. The system of claim 12, wherein the plurality of client accounts subscribe to a communication service provided by the SaaS platform.

14. The system of claim 13, wherein the communication service comprises one or more of a messaging service for text messages or a voice service for voice calls.

15. The system of claim 12, the operations further comprising:

responsive to determining that the first request satisfies the one or more conditions related to the first hierarchy of accounts and the trusted relationship, storing the indication of the trusted relationship between the first client account and the second client account.

16. The system of claim 12, wherein the first client account comprises an organization account and the second client account comprises a primary account ranked below the organization account in the first hierarchy of accounts.

17. The system of claim 12, wherein determining that the first request satisfies the one or more conditions related to the first hierarchy of accounts and the trusted relationship comprises:

determining whether the first client account and the second client account are within a same hierarchy of accounts, wherein the one or more conditions are satisfied responsive to determining that the first client account and the second client account are within the same hierarchy of accounts.

18. The system of claim 17, wherein determining that the first request satisfies the one or more conditions related to the first hierarchy of accounts and the trusted relationship comprises:

responsive to determining that the first client account and the second client account are within the same hierarchy of accounts, determining whether the first client account is ranked above the second client account in the first hierarchy of accounts; and responsive to determining that the first client account is ranked above the second client account in the first hierarchy of accounts, determining whether the second client account is a directly lower-ranked account or an indirectly lower-ranked account, wherein the one or more conditions are satisfied responsive to determining that the first client account is ranked above the second client account in the first hierarchy of accounts and that the second client account is the directly lower-ranked account.

19. The system of claim 12, wherein performing the communication operation on behalf of the second client account using the client asset associated with the first client account and based on the indication of the trusted relationship between the first client account and the second client account comprises:

performing a text messaging operation to send one or more text messages based on the client asset comprising a third-party authorization token that authorizes using a telecommunication network of a third-party service provider to send the one or more text messages.

20. A non-transitory computer-readable medium comprising instructions for managing a client asset in a software as a service (Saas) platform, that responsive to execution by a processing device, cause the processing device to perform operations comprising:

configuring, by the processing device, a plurality of client accounts in a first hierarchy of accounts, the plurality of client accounts comprising a first client account and a second client account ranked in the first hierarchy of accounts;

receiving, via a first application programming interface (API) call associated with the first client account of the SaaS platform, a first request to establish a trusted relationship with the second client account of the SaaS platform to share the client asset associated with the first client account;

determining that the first request satisfies one or more conditions related to the first hierarchy of accounts and the trusted relationship, wherein the first hierarchy of accounts comprises at least three tiers of ranked accounts including a first account tier, a second account tier ranked below the first account tier, and a third account tier ranked below the second account tier, and wherein the one or more conditions comprise a condition based on respective tiers of the first client account and the second client account within the first hierarchy of accounts;

receiving, via a second API call associated with the second client account, a second request to perform a communication operation based on the client asset associated with the first client account; and performing the communication operation on behalf of the second client account using the client asset associated with the first client account and based on an indication of the trusted relationship between the first client account and the second client account, wherein performing the communication operation comprises causing communication data to be transmitted to a recipient device associated with a telephone number, the recipient device associated with a party external to the SaaS platform.

21. The non-transitory computer-readable medium of claim 20, wherein the plurality of client accounts subscribe to a communication service provided by the SaaS platform, and wherein the communication service comprises one or more of a messaging service for text messages or a voice service for voice calls.

* * * * *